United States Patent [19] [11] 3,880,815
Moberly [45] Apr. 29, 1975

[54] ARYLENE SULFIDE POLYMERS
[75] Inventor: Charles W. Moberly, Bartlesville, Okla.
[73] Assignee: Phillips Petroleum Company, Bartlesville, Okla.
[22] Filed: Nov. 19, 1973
[21] Appl. No.: 416,818

[52] U.S. Cl................................. 260/79.1; 260/79
[51] Int. Cl............................................ C08g 23/00
[58] Field of Search............................ 260/79, 79.1

[56] References Cited
UNITED STATES PATENTS
3,354,129  11/1967  Edmonds,Jr. et al................. 260/79

Primary Examiner—Melvyn I. Marquis

[57] ABSTRACT

A method of producing arylene sulfide polymers employing (1) polyhalosubstituted aromatic compounds; (2) carbon disulfide or carbon oxysulfide; (3) bases selected from the hydroxides of lithium, sodium, potassium, rubidium, cesium, magnesium, calcium, strontium and barium and the carbonates of sodium, potassium, rubidium and cesium; and, (4) organic amides.

16 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one of carbon disulfide and carbon oxysulfide, at least one base selected from the hydroxides of lithium, sodium, potassium, rubidium, cesium, magnesium, calcium, strontium and barium and the carbonates of sodium, potassium, rubidium and cesium and at least one organic amide are contacted.

The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. If desired, mixtures of polyhalo-substituted aromatic compounds can be used.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate and mixtures thereof. If desired, the hydroxide can be produced in situ by the reaction of the corresponding oxide with water.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymers can be introduced into contact in any order. Water which can be present in any composite formed from any of the preceding compounds, for example, the composite formed from the polyhalo-substituted aromatic compound, the carbon disulfide and/or the carbon oxysulfide, the base and the organic amide or which can be present in a composite formed from the carbon disulfide and/or the carbon oxysulfide, the base and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the carbon disulfide and/or the carbon oxysulfide, the base and the organic amide is maintained at polymerization conditions to produce the arylene sulfide polymer.

The ratio of reactants can vary considerably but about 0.5 to about 2, and preferably from about 0.6 to about 1.2, gram-moles of the polyhalo-substituted aromatic compound will generally be employed per gram-atom of sulfur in the carbon disulfide and/or carbon oxysulfide. The base generally will be employed in an amount within the range of from about 1 to about 6, and preferably from about 1.5 to about 5, gram-equivalents per gram-atom of sulfur in the carbon disulfide and/or carbon oxysulfide. As used herein, 1 gram-equivalent of the hydroxides of magnesium, calcium, strontium and barium represents the same amount as ½ gram-mole of these substances, whereas for the hydroxides of lithium, sodium, potassium, rubidium and cesium, or for the carbonates of sodium, potassium, rubidium, and cesium, the amount represented by 1 gram-equivalent is considered to be the same as that represented by 1 gram-mole.

The amount of organic amide employed can also vary over a wide range but will generally be within the range of from about 100 grams to about 2500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

The previous statements are based upon the following examples.

In each run, to the open reactor was added 275 grams of N-methyl-2-pyrrolidone (NMP). The desired quantity of 97 or 98% sodium hydroxide was added to the reactor. Carbon disulfide was then introduced into the reactor in the indicated amount.

The reactor was then flushed three times by alternately pressuring with nitrogen to 100 psig and venting to atmospheric pressure.

The contents of the reactor were then heated with stirring until the temperature reached 149°C. Nitrogen was then introduced into the reactor at 0.05 SCF per hour and an overhead distillate was collected. When the reactor temperature reached 196°C., the collection of the distillate, shown to be water and NMP, was discontinued.

The desired amount of 1,4-dichlorobenzene (DCB) and 52 grams of NMP were then introduced into the reactor under nitrogen pressure as a heated, fluid mixture. The reactor contents were then heated to 246°C. and maintained at that temperature for 3 hours.

Thereafter, the reactor contents were cooled to 66°C. or lower and the reactor was vented to atmospheric pressure.

The poly(p-phenylene sulfide) product was recovered by washing twice with methanol and then twice with hot water or by washing 4 times with hot water and filtering between washings.

The polymer was dried in a vacuum at 80°C. or 100°C. using a nitrogen sweep.

Yields were calculated on the basis of 108 grams of poly(p-phenylene sulfide) as the theoretical yield from one mole of 1,4-dichlorobenzene.

The inherent viscosities were determined at 206°C. in 1-chloronaphthalene at a polymer concentration of 0.4 g/100 ml solution. Crystalline melting points (Tm) were determined by differential thermal analysis.

In preparation of the poly(p-phenylene sulfide) from carbon oxysulfide, the same apparatus was employed.

N-Methyl-2-pyrrolidone (275 grams) and sodium hydroxide were charged to the reactor which was then flushed. Carbon oxysulfide was then added to the stirred reactor contents until no pressure increase occurred in the reactor.

The reactor contents were not dehydrated. The 1,4-dichlorobenzene in 52 grams of NMP was then added as was done in the runs employing $CS_2$ and the reaction was conducted for 3 hours at 246°C. The product was washed once with methanol and four times with hot water and vacuum dried.

Data were as indicated in the tables.

TABLE I

| Run No. | Gram-moles Charged CS$_2$ | NaOH | DCB | Polymer Yield Percent | Inherent Viscosity | Ash, Wgt. Percent | Tm °C. | Sulfur Content Wgt. Percent |
|---|---|---|---|---|---|---|---|---|
| 1 | 0.5 | 1.0 | 0.51 | 2.1 | — | — | — | — |
| 2 | 0.25 | 0.75 | 0.346 | 44 | 0.02 | 0.69 | — | — |
| 3 | 0.55 | 2.0 | 1.02 | 35 | 0.02 | 0.05 | — | — |
| 4 | 0.50 | 2.0 | 1.02 | 71 | 0.03 | 0.27 | — | — |
| 5 | 0.50 | 2.0[a] | 1.02 | 59 | 0.04 | 0.92 | — | 26.9 |
| 6 | 0.25 | 1.0 | 0.346 | 94 | 0.05 | 1.5 | — | — |
| 7 | 0.715 | 2.86 | 1.02 | 73[b] | 0.05 | 1.8 | — | — |
| 8 | 0.25 | 1.5 | 0.346 | 2.9 | — | — | — | — |
| 9 | 0.5 | 2.0[a] | 1.0 | 50[c] | 0.03 | 1.02 | — | — |
| 10 | 0.5 | 3.0 | 1.02 | 90 | 0.12 | 1.8 | — | — |
| 11 | 0.5 | 3.0 | 1.02 | 80 | 0.12 | 0.84 | 283 | — |
| 12 | 0.5 | 3.0 | 1.02 | 91[b] | 0.10 | 0.85 | 282 | 27.5 |
| 13 | 0.5 | 3.0 | 1.02 | 91[d] | 0.08 | 0.65 | 282 | — |
| 14 | 0.5 | 3.0[e] | 1.02 | 88 | 0.10 | 8.2 | 280[f] | — |

[a] NaOH added with 100 g water as solution; dehydration before addition of CS$_2$.
[b] Reaction time at 246° C. was 6 hours.
[c] Pressure maintained 47–72 psig by venting.
[d] One hour hold of CS$_2$/NaOH/NMP reaction mixture at 149° C. prior to dehydration.
[e] KOH substituted for NaOH.
[f] Value determined on polymer washed further to reduce ash to 2.3 wgt. %.

TABLE II

| Run No. | Gram-moles Charged COS | NaOH | DCB | Yield Percent | Inherent Viscosity | Ash, Wgt. Percent | Tm °C. | Sulfur Content Wgt. Percent |
|---|---|---|---|---|---|---|---|---|
| 15 | 1.0 | 4.0 | 1.02 | 87 | 0.14 | 0.93 | 286 | 28.2 |

It is within the scope of this invention to bring the polyhalo-substituted aromatic compound, the carbon disulfide and/or carbon oxysulfide, the base and the organic amide into contact in any order.

Also, it is within the scope of this invention to remove water from any combination of the aforesaid compounds.

It will further be evident from the foregoing that various modifications can be made to the method of this invention. Such are considered, however, to be within the scope thereof.

What is claimed is:

1. A method of producing a polymer which comprises:
    a. forming a composition by contacting at least one polyhalo-substituted aromatic compound within the halogen atoms are attached to aromatic ring carbon atoms, at least one compound selected from the group consisting of carbon disulfide and carbon oxysulfide, at least one base selected from the hydroxides of lithium, sodium, potassium, rubidium, cesium, magnesium, calcium, strontium and barium and the carbonates of sodium, potassium, rubidium and cesium and at least one organic amide; and
    b. maintaining at least a portion of said composition at polymerization conditions to produce said polymer.

2. The method of claim 1 in which said polyhalo-substituted aromatic compound is employed in an amount within the range of from about 0.5 to about 2 gram-moles per gram-atom of sulfur in said carbon disulfide or said carbon oxysulfide.

3. The method of claim 1 in which said base is employed in an amount within the range of from about 1 to about 6 gram-equivalents per gram-atom of sulfur in said carbon disulfide or said carbon oxysulfide.

4. The method of claim 2 in which said organic amide is employed in an amount within the range of from about 100 grams to about 2500 grams per gram-mole of polyhalo-substituted aromatic compound.

5. The method of claim 1 in which said polyhalo-substituted aromatic compound is p-dichlorobenzene, said base is sodium hydroxide and said one compound is carbon disulfide.

6. The method of claim 1 in which said polyhalo-substituted aromatic compound is p-dichlorobenzene, said base is sodium hydroxide and said one compound is carbon oxysulfide.

7. The method of claim 1 in which said polyhalo-substituted aromatic compound is employed in an amount within the range of from about 0.5 to about 2 gram-moles per gram-atom of sulfur in said carbon disulfide or said carbon oxysulfide and said base is employed in an amount within the range of from about 1 to about 6 gram-equivalents per gram-atom of sulfur in said carbon disulfide or said carbon oxysulfide.

8. The method of claim 1 in which water is removed from said composition prior to step (b).

9. The method of producing a polymer which comprises:
  a. contacting at least one compound selected from the group consisting of carbon disulfide and carbon oxysulfide, at least one base selected from the hydroxides of lithium, sodium, potassium, rubidium, cesium, magnesium, calcium, strontium and barium and the carbonates of sodium, potassium, rubidium and cesium and at least one organic amide to form a first composition;
  b. contacting at least a portion of said first composition with at least one polyhalo-substituted aromatic compound wherein the halogen atoms are attached to aromatic ring carbon atoms to form a second composition; and
  c. maintaining said second composition at polymerization conditions to produce said polymer.

10. The method of claim 9 in which said polyhalo-substituted aromatic compound is employed in an amount within the range of from about 0.5 to about 2 gram-moles per gram-atom of sulfur in said carbon disulfide or said carbon oxysulfide.

11. The method of claim 9 in which said base is employed in an amount within the range of from about 1 to about 6 gram-equivalents per gram-atom of sulfur in said carbon disulfide or said carbon oxysulfide.

12. The method of claim 9 in which said organic amide is employed in an amount within the range of from about 100 grams to about 2500 grams per gram-mole of polyhalo-substituted aromatic compound.

13. The method of claim 9 in which said polyhalo-substituted aromatic compound is p-dichlorobenzene, said base is sodium hydroxide and said one compound is carbon disulfide.

14. The method of claim 9 in which said polyhalo-substituted aromatic compound is p-dichlorobenzene, said base is sodium hydroxide and said one compound is carbon oxysulfide.

15. The method of claim 9 in which water is removed from said first composition prior to step (b).

16. The method of claim 9 in which said polyhalo-substituted aromatic compound is employed in an amount within the range of from about 0.5 to about 2 gram-moles per gram-atom of sulfur in said carbon disulfide or said carbon oxysulfide and said base is employed in an amount within the range of from about 1 to about 6 gram-equivalents per gram-atom of sulfur in said carbon disulfide or said carbon oxysulfide.

* * * * *